(12) United States Patent
Lin

(10) Patent No.: US 12,220,050 B2
(45) Date of Patent: *Feb. 11, 2025

(54) BLOW-MOLDED RIB STRUCTURE

(71) Applicant: Dongguan Shichang Metals Factory Ltd., DongGuan (CN)

(72) Inventor: Chen-Kang Lin, DongGuan (CN)

(73) Assignee: Dongguan Shichang Metals Factory Ltd., DongGuan (CN)

( * ) Notice: Subject to any disclaimer, the term of this patent is extended or adjusted under 35 U.S.C. 154(b) by 507 days.

This patent is subject to a terminal disclaimer.

(21) Appl. No.: 17/206,546

(22) Filed: Mar. 19, 2021

(65) Prior Publication Data

US 2021/0204686 A1 Jul. 8, 2021

Related U.S. Application Data

(63) Continuation of application No. 15/972,375, filed on May 7, 2018, now Pat. No. 11,026,504.

(51) Int. Cl.
*A47B 13/08* (2006.01)
*A47B 96/20* (2006.01)
*B29C 49/00* (2006.01)
*B29L 31/44* (2006.01)

(52) U.S. Cl.
CPC .............. *A47B 13/08* (2013.01); *A47B 96/20* (2013.01); *B29C 49/00* (2013.01); *B29L 2031/448* (2013.01)

(58) Field of Classification Search
CPC ................................. A47B 96/20; A47B 13/08
See application file for complete search history.

(56) References Cited

U.S. PATENT DOCUMENTS

| | | | |
|---|---|---|---|
| 6,112,674 A | 9/2000 | Stanford | |
| 6,371,034 B1 | 4/2002 | Simpson et al. | |
| 6,519,902 B1 | 2/2003 | Scissom | |
| 11,026,504 B2* | 6/2021 | Lin | B29C 49/0031 |
| 2002/0092445 A1* | 7/2002 | Glover | A47B 3/087 |
| | | | 108/36 |
| 2002/0166837 A1* | 11/2002 | Gonzalez | B29C 45/26 |
| | | | 215/382 |
| 2003/0217676 A1* | 11/2003 | Strong | A47B 13/003 |
| | | | 108/127 |
| 2005/0205437 A1* | 9/2005 | Huffman | B65D 25/20 |
| | | | 206/217 |

(Continued)

FOREIGN PATENT DOCUMENTS

CN 104720421 A 6/2015
WO 9951081 A1 10/1999

*Primary Examiner* — Alicia J Weydemeyer
*Assistant Examiner* — Laura B Figg
(74) *Attorney, Agent, or Firm* — Luedeka Neely, P.C.

(57) ABSTRACT

A blow-molded structural panel has a stiffening rib structure in which the height and width of the rib structure varies over its length. For example, the rib structure may have three tall portions separated by two short portions, with a gradual slope in height between the various portions. The rib structure is preferably wider in the short portions than it is in the tall portions. The lower height of the rib structure in some portions enhances the stiffness of the panel, while also using less material because the plastic does not have to be drawn so deeply into the mold in the short portions.

15 Claims, 3 Drawing Sheets

(56) References Cited

U.S. PATENT DOCUMENTS

2011/0253015 A1* 10/2011 Trimble ................. A47B 13/08
 108/50.11
2012/0024219 A1* 2/2012 Eckert ..................... B63B 34/21
 114/355
2017/0082238 A1* 3/2017 Machande ............. B65D 85/66

* cited by examiner (section A-A)

(section B-B)

BLOW-MOLDED RIB STRUCTURE

FIELD

This invention relates to plastic structures. More particularly, this invention relates to structures constructed from blow-molded plastic and, in particular, to high-strength, low-weight, blow-molded plastic structures used in furniture and structural panels.

BACKGROUND

Various items, such as tables, chairs, partitions, walls, and sports equipment are formed from plastic. In order to reduce the weight of the items, blow-molded plastic is typically used. A blow-molded plastic structure has outer walls that enclose an interior hollow space. While the hollow interior reduces the weight, the hollow interior of such blow-molded items may also reduce the strength of the item so that the item is unable to support a relatively large amount of weight or force.

It is known that strengthening ribs made of metal or other durable material may be added to a blow-molded structure to increase the load-bearing strength of the structure. However, such strengthening ribs often significantly increase the weight of the structure and may create stress points in attachment locations that lead to mechanical failure of the structure.

Strengthening ribs may also be integrally formed from plastic during the blow-molding process in order to increase the load-bearing capability of the blow-molded structure. Such ribs may extend over portions of the length and width of the structure to provide load-bearing support for the structure. However, integrally formed ribs in conventional structures typically have thicker walls that add weight to the structure, increase production time, and increase the cost of producing such structures. While ribs are generally necessary to provide structural support over large expanses of blow-molded panels, geometries that allow for thinner and lighter weight ribs are desired.

In view of the foregoing, there continues to be a need for blow-molded structures having improved load-bearing capability and simple light-weight configurations.

SUMMARY

The above and other needs are met by a blow-molded structural panel having a sloping-height rib structure. The height and the width of the rib structure varies over its length. In one preferred embodiment, the rib has three large-height portions separated by two small-height portions, with a gradual slope in height between the various portions. In some embodiments, the rib structure is wider in the small-height portions than it is in the large-height portions. The lower height of the rib structure in some portions enhances the stiffness of the panel, while also using less material because the plastic does not have to be drawn so deeply into the mold in the small-height portions.

In one embodiment, the blow-molded structural panel includes a panel surface and a stiffening rib structure extending outward from the panel surface. The stiffening rib structure includes a first end portion and a second end portion disposed opposite the first end portion. A first tall portion is disposed adjacent the first end portion. The first tall portion has a first tall portion height. A second tall portion is disposed adjacent the second end portion. The second tall portion has a second tall portion height. One or more short portions are disposed between the first tall portion and the second tall portion. Each short portion has a short portion height that is less than the first tall portion height and less than the second tall portion height.

In some embodiments, the stiffening rib structure includes first and second sloped portions. The first sloped portion, which is disposed between the first end portion and the first tall portion, has a height that slopes from adjacent the panel surface to the first tall portion height. The second sloped portion, which is disposed between the second tall portion and the second end portion, has a height that slopes from adjacent the panel surface to the second tall portion height.

In some embodiments, the stiffening rib structure includes a third tall portion disposed between the first and second tall portions, and the one or more short portions include first and second short portions. The third tall portion has a third tall portion height. The first short portion, which is disposed between the first tall portion and the third tall portion, has a first short portion height that is less than the third tall portion height. The second short portion, which is disposed between the third tall portion and the second tall portion, has a second short portion height that is less than the third tall portion height.

In some embodiments, the stiffening rib structure includes third, fourth, fifth, and sixth sloped portions. The third sloped portion, which is disposed between the first tall portion and the first short portion, has a height that slopes from the first tall portion height to the first short portion height. The fourth sloped portion, which is disposed between the first short portion and the third tall portion, has a height that slopes from the first short portion height to the third tall portion height. The fifth sloped portion, which is disposed between the third tall portion and the second short portion, has a height that slopes from the third tall portion height to the second short portion height. The sixth sloped portion, which is disposed between the second short portion and the second tall portion, has a height that slopes from the second short portion height to the second tall portion height.

In some embodiments, the first and second tall portions of the stiffening rib structure have a tall portion width, and the one or more short portions have a short portion width that is greater than the tall portion width.

In some embodiments, the third tall portion of the stiffening rib structure has a tall portion width, and the first and second short portions have a short portion width that is greater than the tall portion width.

In some embodiments, the blow-molded structural panel is a portion of a tabletop, wherein the panel surface of the blow-molded structural panel comprises a bottom surface of the tabletop.

In another aspect, embodiments provide a blow-molded structural panel including a panel surface and a stiffening rib structure extending outward from the panel surface. The stiffening rib structure includes a first tall portion having a first tall portion height and a first tall portion width, and a second tall portion having a second tall portion height and a second tall portion width. The stiffening rib structure also includes one or more short portions disposed between the first tall portion and the second tall portion. Each short portion has a short portion height that is less than the first tall portion height and less than the second tall portion height. Each short portion has a short portion width that is greater than the first tall portion width and greater than the second tall portion width.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
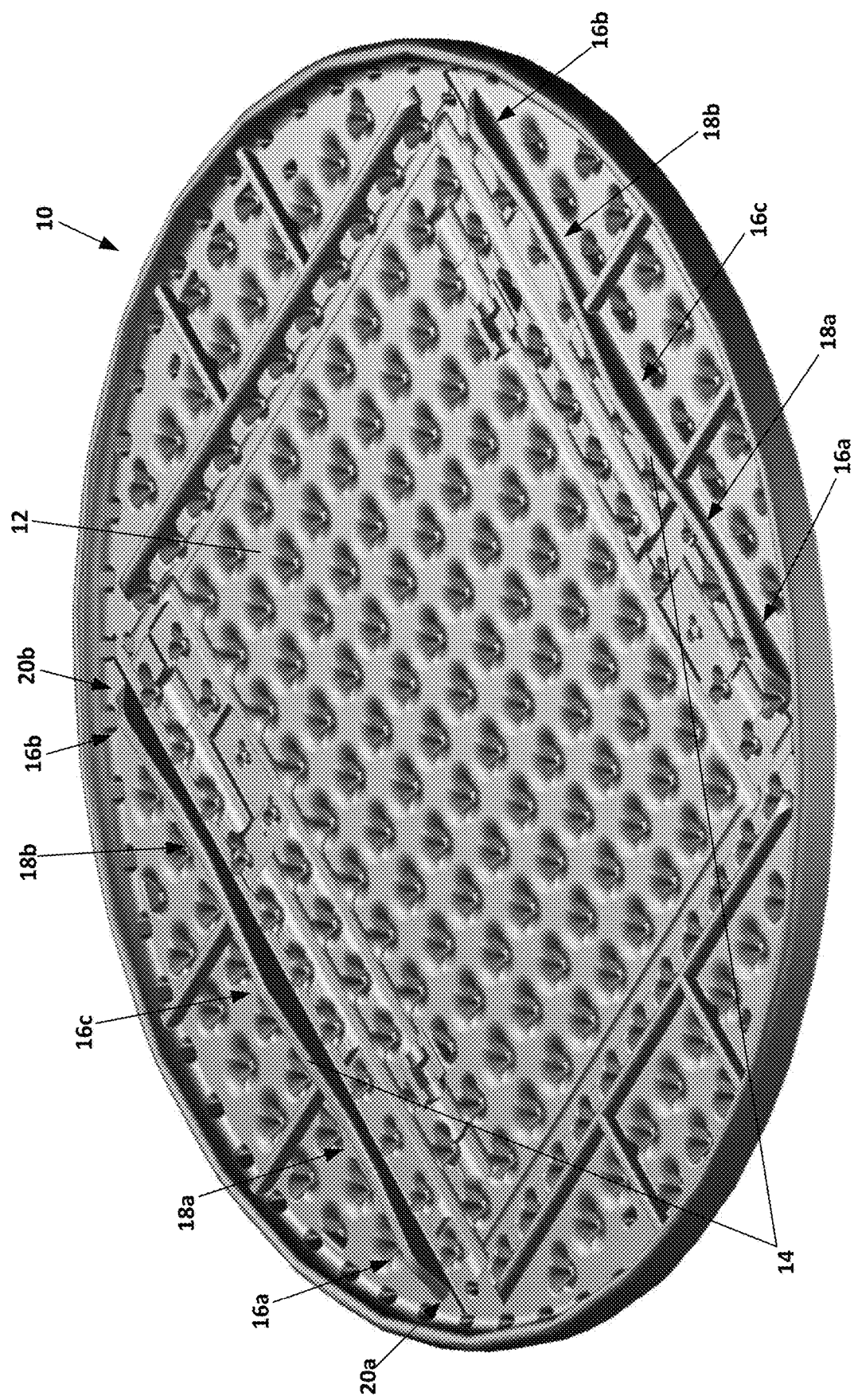
FIG. 1 depicts a blow-molded plastic tabletop having rib structures according to an embodiment of the disclosure.
Figure 2:
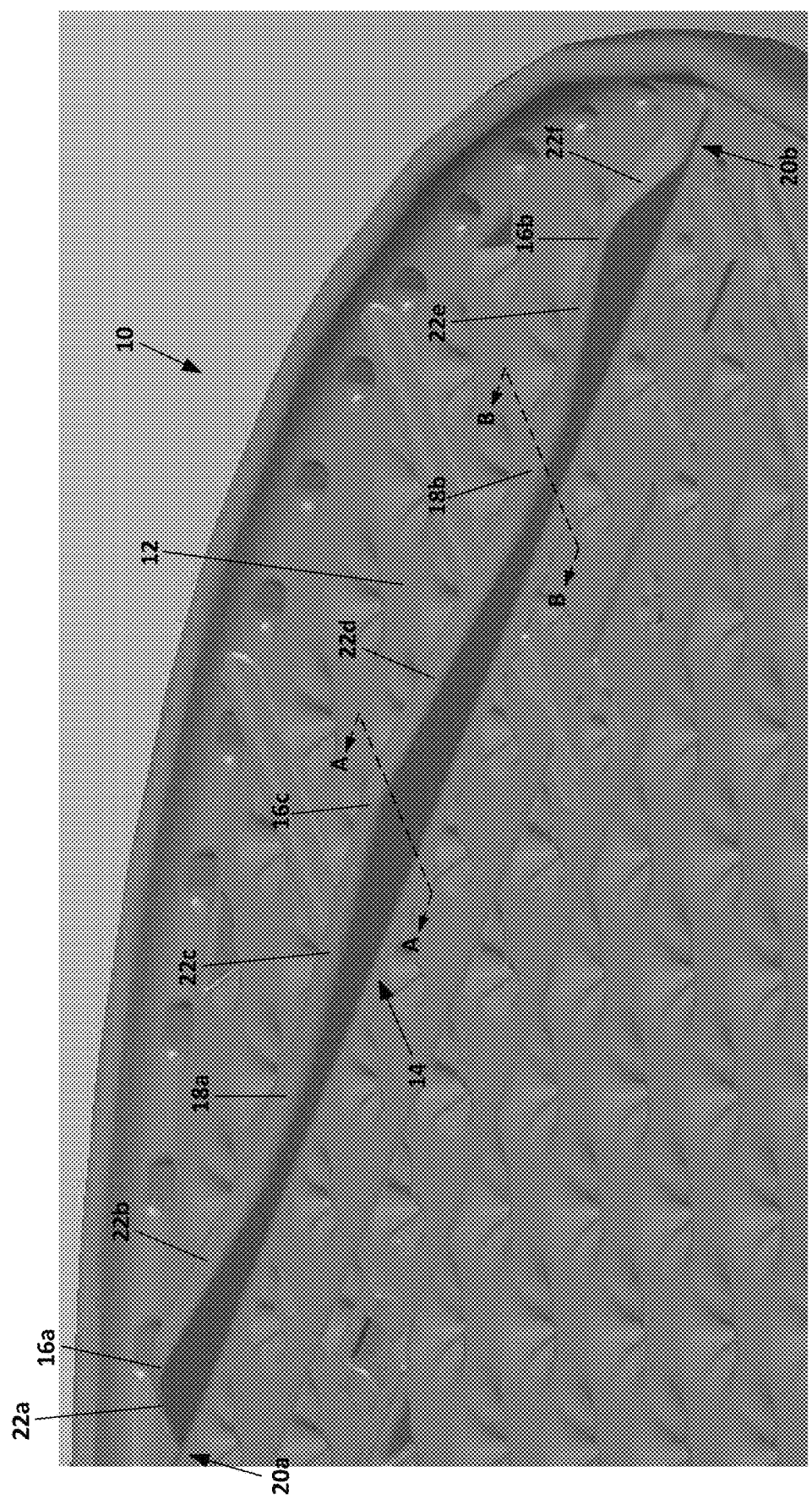
FIG. 2 depicts a detailed view of a rib structure of the blow-molded plastic tabletop shown in FIG. 1.

Embodiments described herein are directed to blow-molded plastic structural panels, such as may be used in furniture, buildings, vehicles, and other structures. One example of a blow-molded panel is a blow-molded plastic tabletop 10 as shown in FIGS. 1 and 2. The tabletop 10 has a bottom surface 12, and extending therefrom are a plurality of stiffening rib structures 14 that are integrally formed in the bottom surface 12 during the blow-molding process. Each rib structure 14 extends vertically outward from the bottom surface 12 by various distances referred to herein as heights of various portions of the rib structure 14.

Figure 3:
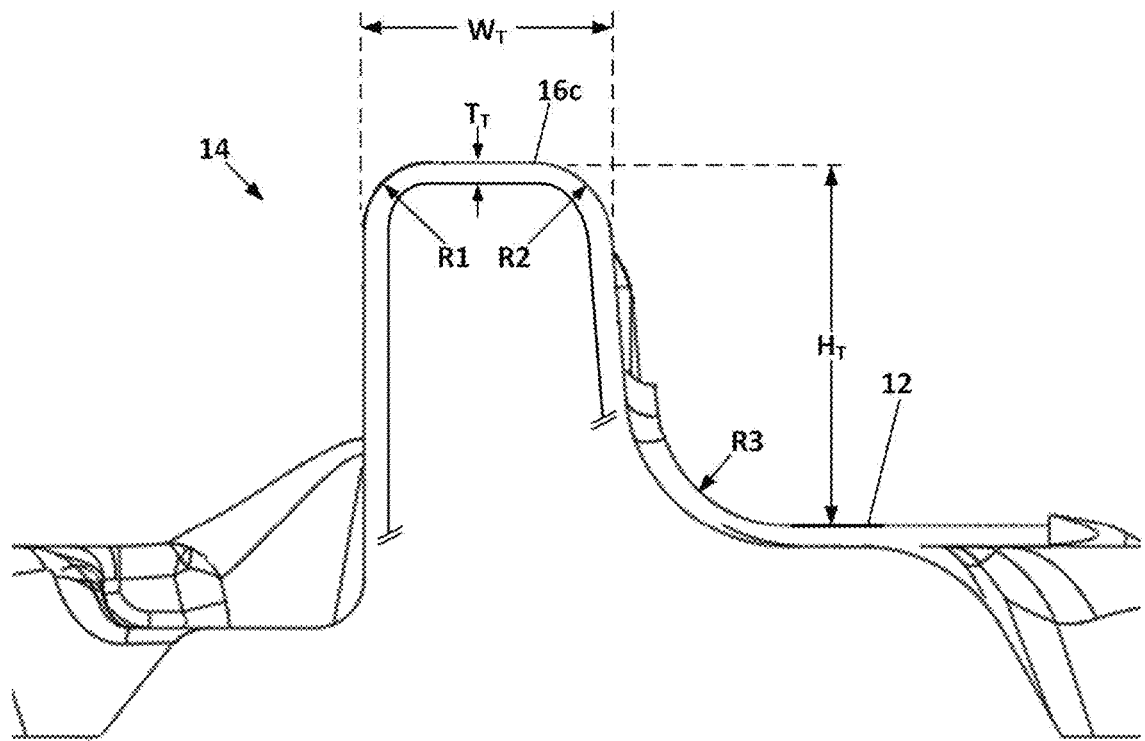
FIGS. 3 and 4 depict cross-sectional views of the rib structure shown in FIG. 2.
Figure 4:
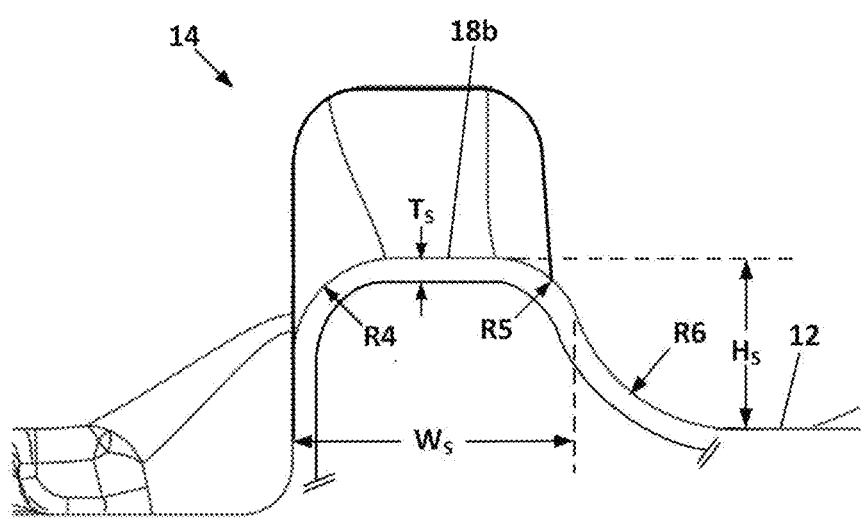

As shown in FIGS. 1 and 2, the length of the rib structure 14 extends from a first end portion 20a to a second end portion 20b. The height of the rib structure 14 varies along its length, including tall portions 16a, 16b, 16c, and short portions 18a, 18b. For example, as shown in FIGS. 3 and 4, the height $H_T$ of the rib structure 14 in the tall portion 16c (also referred to as the third tall portion height) is preferably about 23.7 mm, whereas the height $H_S$ in the adjacent short portion 18b (also referred to as the second short portion height) is preferably about 10.5 mm. In the embodiment depicted in the figures, there are three tall portions, referred to herein as the first tall portion 16a, the second tall portion 16b, and the third tall portion 16c, and there are two short portions, referred to herein as the first short portion 18a and the second short portion 18b. However, it will be appreciated that there may be more or fewer tall portions and more or fewer short portions in other embodiments. Thus, the invention is not limited to any particular number of tall or short portions.

In a preferred embodiment, the width of the rib structure 14 also varies over its length. For example, the width $W_T$ of the rib structure 14 in the central tall portion 16c (also referred to as the third tall portion width) is preferably about 15.0 mm, whereas the width $W_S$ in the adjacent short portion 18b (also referred to as the second short portion width) is preferably about 17.4 mm.

In the tall portions 16a-16c, the ratio of width $W_T$ to height $H_T$ preferably ranges from about 53% to about 73%, and is preferably about 63%. In the short portions 18a-18b, the ratio of height $H_S$ to width $W_S$ preferably ranges from about 50% to about 70%, and is preferably about 60%.

As shown in FIGS. 3 and 4, the radii of curvature R1 and R2 within the tall portions 16a-16c preferably range from about 4.1 mm to about 5.0 mm, whereas the radii of curvature R5 and R4 within the short portions 18a-18b preferably range from about 5.2 mm to about 6.3 mm. The radii of curvature R3 and R6 where the rib structure 14 meets the other portions of the bottom surface 12 preferably range from about 10.0 mm to about 10.5 mm.

In the wide short portions 18a-18b, the plastic material of the bottom surface 12 is drawn less deeply into the mold than it is in the narrow tall portions 16a-16c. Due to the difference in draw depth, the thickness of the plastic material of the bottom surface 14 within the tall portions 16a-16c tends to be less than the thickness of the plastic material of the bottom surface 12 within the short portions 18a-18b. In the example depicted in FIGS. 3 and 4, the thickness $T_T$ of the plastic material in the tall portions 16a-16c preferably ranges from about 1.2 mm to about 1.5 mm over the width of the rib structure 14, whereas the thickness $T_S$ of the plastic material in the short portions 18a-18b preferably ranges from about 1.5 mm to about 1.8 mm over the width of the rib structure 14. In one preferred embodiment, $T_T$ is about 1.25 mm and $T_S$ is about 1.61 mm.

With continued reference to FIG. 2, the rib structure 14 includes several sloped portions 22b, 22c, 22d, and 22e that connect the short portions 18a-18b and the tall portions 16a-16c. In a preferred embodiment, these sloped portions 22b-22e have heights that slope gradually between the height $H_T$ and the height $H_S$. A preferred embodiment also includes a sloped portion 22a that connects the first end portion 20a to the first tall portion 16a, and a sloped portion 22f that connects the second end portion 20b to the second tall portion 16b. These sloped portions 22a and 22f have heights that transition gradually between the height $H_T$ and the heights of the end portions 20a-20b adjacent the lower surface 12 of the tabletop 10.

Advantages of the rib structure described herein include:
less plastic material is required compared to prior structures;
the material thickness in the tall portions of the rib structure can be drawn not as deeply as a conventional blow-molded structure, thereby maintaining strength; and
the rib structure provides greater strength for fastening the steel frame to the tabletop, resulting in a lower rate of material failure.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A blow-molded structural panel comprising:
a panel surface; and
a blow-molded stiffening rib structure formed integrally with and extending outward from the panel surface, the stiffening rib structure comprising:
a first tall portion having a first tall portion height and a first tall portion width;
a second tall portion having a second tall portion height and a second tall portion width,
wherein the first and second tall portions have a tall portion thickness; and
one or more short portions disposed between the first tall portion and the second tall portion, the one or more short portions having a short portion height that is less than the first tall portion height and less than the second tall portion height, and having a short portion width that is greater than the first tall portion width and greater than the second tall portion width, and having a short portion thickness that is greater than the tall portion thickness.

2. The blow-molded structural panel of claim 1 wherein the stiffening rib structure further comprises:
   a first end portion;
   a second end portion disposed opposite the first end portion;
   a first sloped portion disposed between the first end portion and the first tall portion, the first sloped portion having a height that gradually slopes from adjacent the panel surface to the first tall portion height; and
   a second sloped portion disposed between the second tall portion and the second end portion, the second sloped portion having a height that gradually slopes from adjacent the panel surface to the second tall portion height.

3. The blow-molded structural panel of claim 1 wherein the stiffening rib structure further comprises:
   a third tall portion disposed between the first tall portion and the second tall portion, the third tall portion having a third tall portion height and a third tall portion width; and
   the one or more short portions comprising:
      a first short portion disposed between the first tall portion and the third tall portion, the first short portion having a first short portion height that is less than the third tall portion height, and a first short portion width that is greater than the third tall portion width; and
      a second short portion disposed between the third tall portion and the second tall portion, the second short portion having a second short portion height that is less than the third tall portion height, and a second short portion width that is greater than the third tall portion width.

4. The blow-molded tabletop of claim 3, further comprising:
   a third sloped portion disposed between the first tall portion and the first short portion, and having a width that gradually increases from the first tall portion width to the first short portion width,
   a fourth sloped portion disposed between the third tall portion and the first short portion, and having a width that gradually increases from the third tall portion width to the first short portion width,
   a fifth sloped portion disposed between the second tall portion and the second short portion, and having a width that gradually increases from the second tall portion width to the second short portion width, and
   a sixth sloped portion disposed between the third tall portion and the second short portion, and having a width that gradually increases from the third tall portion width to the second short portion width.

5. The blow-molded tabletop of claim 4 wherein each of the third, fourth, fifth, and sixth sloped portions are longer than each of the first, second, and third tall portions.

6. The blow-molded structural panel of claim 1 comprising a portion of a tabletop, wherein the panel surface of the blow-molded structural panel comprises a bottom surface of the tabletop.

7. A blow-molded tabletop comprising:
   a bottom surface; and
   a blow-molded stiffening rib structure formed integrally with and extending outward from the bottom surface, the stiffening rib structure comprising:
      a first end portion;
      a second end portion disposed opposite the first end portion;
      a first tall portion disposed adjacent the first end portion, the first tall portion having a first tall portion height;
      a first sloped portion disposed between the first end portion and the first tall portion, the first sloped portion having a height that gradually slopes from adjacent the bottom surface to the first tall portion height;
      a second tall portion disposed adjacent the second end portion, the second tall portion having a second tall portion height;
      a second sloped portion disposed between the second tall portion and the second end portion, the second sloped portion having a height that gradually slopes from adjacent the bottom surface to the second tall portion height;
      a third tall portion disposed between the first tall portion and the second tall portion, the third tall portion having a third tall portion height;
      a first short portion disposed between the first tall portion and the third tall portion, the first short portion having a first short portion height that is less than the first and third tall portion heights;
      a third sloped portion disposed between the first tall portion and the first short portion, the third sloped portion having a height that gradually slopes from the first tall portion height to the first short portion height;
      a fourth sloped portion disposed between the third tall portion and the first short portion, the fourth sloped portion having a height that gradually slopes from the third tall portion height to the first short portion height;
      a second short portion disposed between the second tall portion and the third tall portion, the second short portion having a second short portion height that is less than the second and third tall portion heights;
      a fifth sloped portion disposed between the second tall portion and the second short portion, the fifth sloped portion having a height that gradually slopes from the second tall portion height to the second short portion height; and
      a sixth sloped portion disposed between the third tall portion and the second short portion, the sixth sloped portion having a height that gradually slopes from the third tall portion height to the second short portion height,
      wherein each of the third, fourth, fifth, and sixth sloped portions are longer than each of the first, second, and third tall portions,
      wherein the first, second and third tall portions have a tall portion thickness, and
      wherein the first and second short portions have a short portion thickness that is greater than the tall portion thickness.

8. The blow-molded tabletop of claim 7 wherein each of the first and second short portions are wider than each of the first, second, and third tall portions.

9. The blow-molded tabletop of claim 8 wherein
   the third sloped portion has a width that gradually increases from a width of the first tall portion to a width of the first short portion,
   the fourth sloped portion has a width that gradually increases from a width of the third tall portion to a width of the first short portion, the fifth sloped portion has a width that gradually increases from a width of the second tall portion to a width of the second short portion, and the sixth sloped portion has a width that gradually increases from a width of the third tall portion to a width of the second short portion.

10. The blow-molded structural panel of claim 1 wherein the tall portion thickness ranges from 1.2 mm to 1.5 mm.

11. The blow-molded structural panel of claim 1 wherein the short portion thickness ranges from 1.5 mm to 1.8 mm.

12. The blow-molded structural panel of claim 1 wherein the tall portion thickness is 1.25 mm and the short portion thickness is 1.61 mm.

13. The blow-molded tabletop of claim 7 wherein the tall portion thickness ranges from 1.2 mm to 1.5 mm.

14. The blow-molded tabletop of claim 7 wherein the short portion thickness ranges from 1.5 mm to 1.8 mm.

15. The blow-molded tabletop of claim 7 wherein the tall portion thickness is 1.25 mm and the short portion thickness is 1.61 mm.

* * * * *